May 29, 1951     L. M. SWIFT     2,554,844
CASING COLLAR LOCATOR
Filed March 22, 1946

Inventor
LAWRENCE M. SWIFT
By James Y. Cleveland
Attorney

Patented May 29, 1951

2,554,844

UNITED STATES PATENT OFFICE 2,554,844

CASING COLLAR LOCATOR

Lawrence M. Swift, Tulsa, Okla., assignor to Well Surveys, Incorporated, Tulsa, Okla., a corporation of Delaware Application March 22, 1946, Serial No. 656,181

6 Claims. (Cl. 73—152)

This invention relates to the art of well logging and more especially to apparatus adapted to simultaneously log a well and record the position relative to the well log of markers fixed along the depth of the well bore.

The object of well logging is to obtain a series, preferably a continuous series, of measurements characteristic of the drillhole or of the strata surrounding the drillhole, and correlate these measurements with indications of the depths at which they are made. Ordinarily, the results of the well logging operation are obtained in the form of a chart in which the magnitudes of the various measurements are plotted against indications of the depth at which they are made.

In the usual process of well logging, the indications of depths are the result of measurements of the amount of cable paid out from the surface to the well logging instrument in the well bore. Experience has shown that such measurements are not always accurate. It is difficult to measure accurately the amount of cable paid out; the cable is inclined to stretch due to its own weight and the weight of the surveying instrument attached to its lower end; and at times the well logging instrument may bind to a greater or lesser degree in the drillhole. For all of these reasons it is desirable to accurately confirm the depth measurements obtained by measuring the amount of cable paid out.

In accordance with the present invention, it has been found that accurate indications of depths may be obtained, which may be used as a check against the measurements of the amount of cable paid out, or may be used instead of these measurements, if the well surveying device is so constructed that it not only performs the usual well surveying function, but also generates an appropriate signal each time that it passes one of a series of markers already placed at fixed depths in the well. Such markers are preferably the junctions between the sections of the well casing. Since well casing normally consists of standard lengths of pipe joined by steel collars, there occurs in the ordinary cased well a difference that can easily be detected at each junction between casing sections. This difference consists in a break in the casing wall and the additional band of steel comprising the collar, which surrounds the break and connects adjacent lengths of casing.

Under such conditions, if a magnetic field is created in the well bore and caused to be of such a configuration as to extend into the surrounding casing, and this field is lowered down the well bore, it will remain substantially unchanged except when it passes a junction between two casing sections. At that time, the break in the casing wall, or the surrounding band of steel comprising the collar, or both, will alter the configuration of the magnetic field to such an extent as to be easily detectable.

Along with a well surveying device which is to be lowered into a drillhole, it is a relatively simple matter to provide means for creating a magnetic field that will extend into the well casing and also to provide a detecting means that will detect any substantial change in the configuration of this field. The signal which results from the detection of such change in configuration of the magnetic field may then be used to determine or calibrate the depth scale against which the primary measurements are recorded.

According to the present invention this is accomplished by imposing a distinctive signal upon a circuit that carries the well logging measurements to the recorder at the top of the well and this signal causes the recorder itself to make a distinctive indication on the record each time a casing junction is passed. Since the casing junctions are passed only at intervals some distance apart, the resulting signal need not disturb the ordinary well log to an appreciable extent.

For a detailed understanding of the preferred embodiment of this invention and for a further understanding of its general principles, reference may be had to the appended drawings and the following detailed description thereof.

Figure 1:
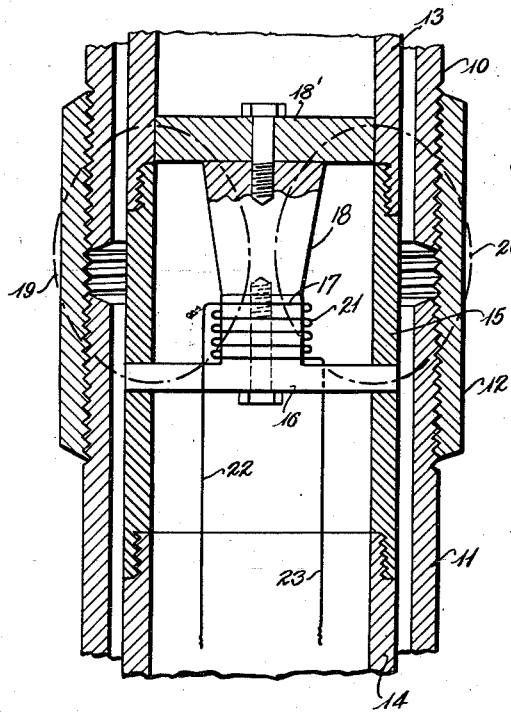
Figure 1 is a vertical view, partly in cross-section, of a part of a well surveying device with the preferred form of marker locating means embodied therein.

As shown in Figure 1, the usual cased well is lined with a series of casing sections, such as are indicated at 10 and 11, and adjacent casing sections are joined by casing collars; as illustrated at 12.

It is now common practice to explore cased wells by lowering into them an exploring capsule suspended from a cable which extends from the surface. Such a capsule normally consists of an outer shell enclosing one or more electrical or electronic measuring devices, and whatever electrical circuits are necessary for transmitting the information obtained by the exploring device or devices, to the surface of the earth. The enclosing capsule is usually comprised of one or more sections of cylindrical steel casing closed at the ends and attached to the lower end of a supporting cable.

Two sections of such a casing are illustrated at 13 and 14, and normally these two sections would be screwed together to form a tight seal. In order to incorporate the principles of this invention in the well surveying instrument, however, an additional section of cylindrical casing 15 may be inserted between the original casing sections 13 and 14. This new section 15 is arranged to screw tightly in the place between the original sections and is of sufficient strength to withstand the pressures that are to be encountered, but is made of a non-magnetic material such, for example, as brass.

Mounted in the non-magnetic casing section 15 there is an annular pole piece 16 of a magnetic material. This pole piece 16 may be constructed to extend through the walls of the non-magnetic casing section 15 so that its outer periphery is flush with the outer wall of the casing. Pole piece 16 is connected to or made integral with a magnetic flux conductor 17 which extends upwardly and connects with a strong permanent magnet 18. The linking piece 17 lies between the pole piece 16 and the permanent magnet 18, and the permanent magnet 18 is positioned within the end of the adjacent casing section 13 which is of magnetic material.

The upper pole piece 18' of magnet 18 is also made annular in shape. By making both the upper pole of magnet 18 and the pole piece 16 annular in shape they will always contact the casing where no casing joints are located regardless of the orientation of the instrument in the well.

The permanent magnet, its linkage element and pole pieces may be secured together by screws as illustrated in Figure 1.

With such an arrangement of elements a magnetic circuit is established with the well casing as the instrument traverses the well. The circuit may be defined to include the magnet 18, its annular pole, a portion of the instrument housing 13, the well casing, annular pole piece 16, and linkage 17. The reluctance of this circuit will remain substantially constant when the instrument is traversing a section of well casing and as a result a substantially constant flux will flow in the magnetic circuit. However, when the instrument traverses a junction between adjacent sections of casing, the reluctance of the magnetic circuit is changed and as a result there will be a change in the magnetic flux flowing in the circuit. The change in reluctance is due to a change in the magnetic circuit which may be brought about in at least two ways.

One way in which a change in magnetic circuit occurs is by the additional metal in a casing collar. When the instrument is adjacent a casing collar, the new magnetic circuit includes the magnet 18, its annular pole piece, a portion of the instrument housing 13, casing section 11, casing collar 12, casing section 10, annular pole piece 16, and linkage 17. As the instrument traverses the casing junction, the reluctance of the magnetic circuit will vary, thereby producing a change in the magnetic flux flowing in the circuit. This change in flux may be detected by a coil 21 positioned about the pole piece 16. The change in the flux field that links the coil 21 will produce a voltage that will cause current to flow in an external circuit that is connected to conductors 22 and 23.

Another way in which the magnetic circuit can be changed is by making pole piece 16 thin relative to the length of the air gap between the ends of adjacent casing sections. With such an arrangement, when the pole piece 16 passes ends of adjacent sections of casing which are connected by a collar, an air gap is introduced in the magnetic circuit. This will greatly increase the reluctance of the circuit resulting in a decrease in the magnetic flux flowing in the circuit. This produces a change in the flux field linking coil 21 thereby producing a voltage that will cause a flow of current in an external circuit which is connected to the conductors 22 and 23.

Figure 2:
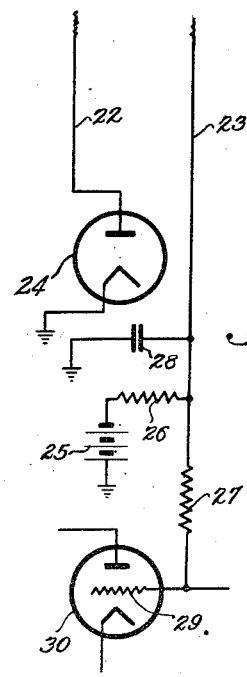
Figure 2 is a circuit diagram illustrating the manner of connecting the marker locating means into the electrometer circuit of the well logging device.
Figure 4:
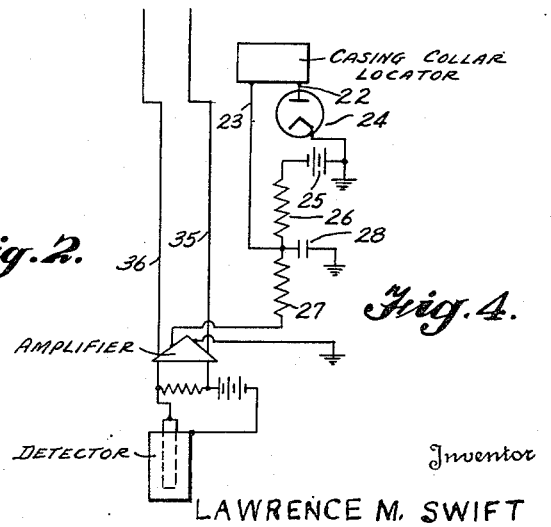
Figure 4 is a diagrammatic illustration of the electrical system for the subsurface apparatus used in radioactivity well surveying, showing the instant invention and its relation thereto.

As illustrated in Figures 2 and 4, the signal current carried from the coil 21 by the conductors 22 and 23 is used to impress on the output circuit of the well logging device, an appropriate signal indicative of the passing of a casing junction.

First, since the passing of a casing junction changes the magnetic field and then permits the magnetic field to return to its previous state, there results in the coil 21, a current first in one direction and then in the other. By connecting the conductor 22 to ground through a rectifier 24, the current in one direction is eliminated and the signal, which is to be used, is reduced to a single surge of current in one direction.

By properly connecting the conductor 23 to an element of one of the amplifier output tubes 30 of the well surveying circuit, this surge of current can be caused to momentarily alter the output of that tube to send a distinctive signal to the recording equipment at the surface of the earth.

It is preferred to accomplish this by furnishing the normal grid bias for the output amplifier tube 30 from a battery 25 connected in series with resistances 26 and 27 to the grid 29 of the amplifier tube 30. The conductor 23 is then connected to this circuit between the resistances 26 and 27 and a condenser 28 is connected between the conductor 23 and ground. Minor currents generated by reason of small variations in the well casing will not affect the action of the amplifier tube 30, but instead will pass through the condenser 28, the resistor 26 and the battery 25 to ground without any appreciable effect on the amplifier tube. However, by properly proportioning the condenser and resistances, the surge of current that occurs when a casing collar is passed will be sufficient to change the charge of the condenser to an appreciable extent. Until this charge on the condenser has leaked off through the resistor 26 and battery 25, the change in voltage will affect the grid 29 of the amplifier tube 30 and send to the surface the desired indication.

By properly arranging the polarity of the signals from the coil 21, that is, by causing the rectifier 24 to pass current in the proper direction, and properly proportioning the resistances 26 and 27 and the condenser 28, the surge of current that results from the passing of a casing junction can be caused to charge the condenser 28 so as to place an additional negative bias on the grid 29 when the casing junction is passed. If the arrangement is such that this bias is sufficient, the bias can be made to completely stop the operation in the tube, thus making the output of the well logging circuit momentarily zero. This condition will continue for only so long a time as it takes the condenser to discharge through the resistor 26, probably not more than one-half to two seconds, and this interruption, when observed at the surface is an indication of the passing of a casing junction.

Numerous other arrangements may obviously be utilized for impressing an indication of each casing junction on the output of the well surveying device, but the one described has been found simple and practical.

Figure 3:
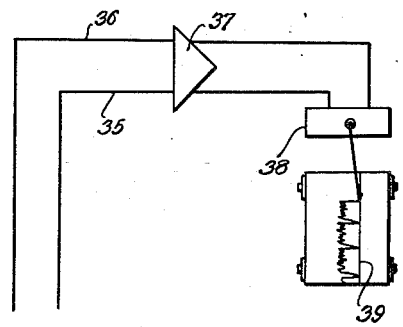
Figure 3 is a circuit diagram of a recording circuit for use in conjunction with the electrometer circuit illustrated in Figure 2.

In Figure 3, there is shown a simple form of a surface recorder which comprises input leads 35 and 36 connected to an amplifier 37, the output of which is connected to a recorder 38. As shown on the chart paper of the recorder, the pen of the recorder drops back to a zero line 39 each time a casing junction is passed.

To simplify the explanation of the present invention, its principles have been applied to a very simple type of well logging circuit. In practice, it has been found desirable to apply the same principles to a well logging circuit of the type described in the Scherbatskoy et al. Patent No. 2,349,225, granted May 16, 1944. In applying the principles to the circuit shown in the Scherbatskoy et al. patent, the grid 145 of the output amplifier 118' in Figure 7 of that patent, will be controlled by the circuit illustrated in Figure 2 of this application. On the surface, the output of both the phasing and the signal circuit will drop to zero when the output of the device of the well is interrupted and hence the meter 281 in the phasing circuit of Figure 12 will indicate the interruptions and can be arranged to record them on the well log. One expedient way to do this is to arrange for a second pen on the well logging recorder and to connect this second pen so that it will be operated when the output of the phasing circuit drops to zero. The second pen can thus place an indication on the chart independent of the well log. It is worth noting in connection with the application of the principles of this invention to the apparatus of the Scherbatskoy et al. patent, that since both the signal current and the phasing current drop to zero when a casing junction is passed, the position of the well logging recorder pen will not be affected but will simply remain constant during the short interruption in signals.

I claim:

1. Apparatus for logging cased wells that comprises means for detecting at a plurality of depths in a well bore phenomena characteristics of the surrounding strata by producing signals proportionally related to said phenomena, means for concomitantly establishing a magnetic field extending into the surrounding casing, means for detecting variations in said magnetic field due to junctions of the casing sections by producing an additional signal, means for combining said first signals and the additional signal, a recorder located at the surface of the earth, means for transmitting the resultant signals to the recorder for actuation of the same.

2. Apparatus for logging cased wells that comprises first detecting means for detecting at a plurality of depths in a well phenomena characteristic of the surrounding strata by producing signals proportionally related to said phenomena, means for producing with the casing of the well a magnetic circuit, means for energizing said magnetic circuit to produce a flow of flux therethrough, a second detecting means for detecting a change in the magnetic flux when the junction of adjacent casing sections form a part of the magnetic circuit by producing signals indicative thereof, means for introducing the last mentioned signals into the first detecting means to superimpose them on the signals characteristic of the phenomena being detected by said first detecting means, a recorder located at the surface of the earth, means for transmitting the resultant signals to the recorder for the operation of the same.

3. Apparatus for logging a cased well that comprises first detecting means for detecting at a plurality of depths phenomena characteristic of the surrounding strata by producing proportionally related signals, said means including means for amplifying said signals, means for transmitting the signals to the surface of the earth and a recorder located on the surface of the earth adapted to be actuated by the transmitted signals, second detecting means associated with said first detecting means for detecting the junctions between adjacent sections of casing whose depths are known, means operable by said second detecting means for altering the operation of said amplifying means when adjacent the junctions whereby the record of the recorder will indicate the location of the junctions relative to the phenomena being detected by said first detecting means.

4. Apparatus for logging a cased well that comprises first detecting means for detecting at a plurality of depths phenomena characteristic of the surrounding formations by producing proportionally related signals, means for traversing the well with said detecting means, said detecting means including electronic means which utilizes at least one thermionic tube for amplifying said signals, a recorder located at the surface, means for operating the recorder in coordination with the depth at which the detections are made, and means for transmitting the amplified signals to the recorder for the operation of the same, means associated with said first detecting instrument and adapted to move with the first detecting instrument for detecting the junctions of adjacent sections of casing when they are traversed by producing signals indicative of the junctions, means for impressing the last recited signals on an element of the thermionic tube of the amplifier forming a part of the detecting means to vary the operation of the amplifier when a junction is traversed, whereby the record of the recorder will indicate the location of the junctions relative to the phenomena being detected by said first detecting means.

5. In a system for logging cased wells having a capsule which is adapted to traverse the well and which contains means for producing a varying signal proportionally related in its magnitude of variation to a selected physical property of the surrounding strata, a recorder driven in correlation with the depth of the capsule, and means for transmitting the varying signal to the recorder for the operation of the same, the improvement which comprises means for detecting casing collars which are traversed by the capsule by producing signals indicative of their proximity, means for introducing said signals into the transmitting means of said system, whereby an indication of the casing collar signals will be produced on the record made by said recorder.

6. In a system for logging cased wells having a capsule which is adapted to traverse the well and which contains means for producing a varying signal proportionally related in its magnitude of variation to a selected physical property of the surrounding strata, a recorder driven in correlation with the depth of the capsule, and means for transmitting the varying signal to the recorder for the operation of the same, the improvement which comprises magnetic means for detecting casing collars which are traversed by the capsule by producing signals indicative of their proximity, means for introducing said signals into the transmitting means of said system, whereby an indication of the casing collar s[ignals] will be produced on the record made by [said] recorder.

LAWRENCE M. SWI[FT]

REFERENCES CITED

The following references are of record i[n the] file of this patent:

UNITED STATES PATENTS

| Number | Name | Dat[e] |
|---|---|---|
| 2,156,519 | Walker | May 2 |
| 2,219,274 | Scherbatskoy | Oct. 22 |
| 2,228,623 | Ennis | Jan. 14 |
| 2,281,960 | Vacquier | May 5 |
| 2,421,423 | Krasnow | June 3 |